Sept. 25, 1962  E. CATT  3,055,267
EYE GLASS ATTACHMENT
Filed Sept. 27, 1960
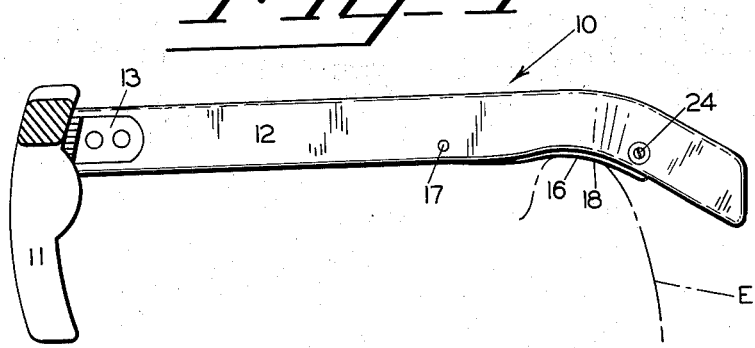
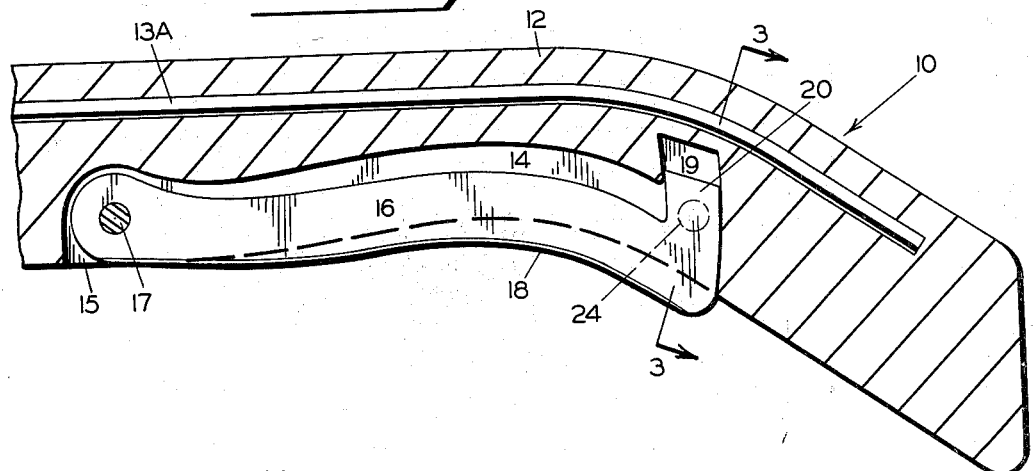
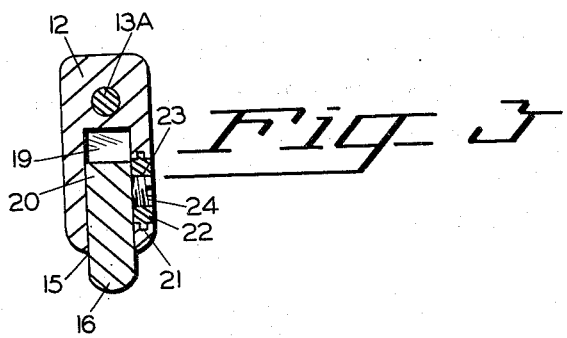
INVENTOR.
ELIZABETH CATT
BY
*Kimmel & Crowell*
ATTORNEYS

United States Patent Office 3,055,267
Patented Sept. 25, 1962

3,055,267
EYE GLASS ATTACHMENT
Elizabeth Catt, 349 18th Ave., Longview, Wash.
Filed Sept. 27, 1960, Ser. No. 58,679
3 Claims. (Cl. 88—52)

This invention relates to an eye glass adjustment and has particular adaptability to a means for adjusting the relative height of the opposite temples of a pair of eye glasses in relation to the ears of an individual wearer.

As conducive to a clearer understanding of this invention, it may here be pointed out that it frequently happens that the ears of an individual are set anatomically at slightly different heights on the side of the head relative to the horizontal level of the eyes. While this difference is usually very slight, and is substantially immaterial to the wearers of ordinary eye glasses, it becomes important to those wearers of bifocal glasses in that if there is any variance from the normal line of vision, one or the other of the separation lines in the lenses will cause the wearer discomfort due to the fact that his vision is disrupted by the line of separation between the two powers of a particular lens. In such cases the necessary adjustment is conventionally made by the oculist or optometrist, but since such adjustment must be absolutely accurate, frequent return trips have hitherto been necessary.

The instant invention contemplates an adjustable member carried by each temple of the eye glasses which may be originally adjusted by the oculist, and, if subsequent adjustment becomes necessary, may be done by the individual and repeated as many times as may be necessary to ensure the most comfortable wearing of the eye glasses.

An additional object of the invention is the provision of such a device which may be built into the temples of a conventional pair of eye glasses with a minimum of difficulty, cost and expense, and by means of which a suitable adjustment may be made easily and expeditiously by the wearer of the glasses as may be necessary.

Still other objects reside in the combinations of elements, arrangements of parts, and features of construction, all as will be more fully pointed out hereinafter and disclosed in the accompanying drawing wherein there is shown a preferred form of this inventive concept.

In the drawings:

FIGURE 1 is a side sectional view taken through a pair of eye glasses, showing one temple thereof in elevation with the adjustment of the instant invention applied thereto.

FIGURE 2 is an enlarged sectional view taken vertically along the center line of the end of the temple; and FIGURE 3 is a sectional view taken substantially along the line 3—3 of FIG. 2 as viewed in the direction indicated by the arrows.

Similar reference characters refer to similar parts throughout the several views of the drawing.

Referring now to the drawings in detail, there is generally indicated at 10 a portion of a conventional eye glass frame including a rim 11 and a temple 12 which is hinged by means of the usual hinge 13 to the rim. Temple 12 is comprised of the customary plastic or similar material and includes the usual reinforcing wire 13a.

Positioned interiorly of each temple 12 is a longitudinally extending recess 14 which is positioned to overlie the normal tip of the ear E. The recess 14 is open at its bottom 15 to provide longitudinally extending slot along the underside of the temple 12.

An elongated support member 16 is pivotally mounted as on a pivot 17 adjacent the forward end of recess 14, or that end toward the rims 11. The underside of member 16 is arcuately curved as indicated at 18 to conform to the top of the ear E, and when swung about the pivot 17, effectively varies the distance between the temple 12, on its underside and the top of the ear E.

The slot 14 includes an upwardly extending offset portion 19, within which projects an offset portion 20 of member 16, the slot portion 19 and the extending portion 20 serving to align and limit the pivotal movement of member 16. A bore 21 extending through one of the side walls of temple 12 contains a bushing 22 which has an interiorly threaded bore 23 therein within which is positioned a set screw 24, the arrangement being such that tightening of the set screw 24 serves clampingly to hold the extending portion 20 of member 16 in a selected position of pivotal adjustment.

By virtue of the arrangement thus described it will be seen that by loosening the set screw 24 member 16 may be rotated about the pivot 17 effectively to increase the thickness of the temple 12, and accordingly vary the alignment of rims 11 and their associated lenses with the eyes.

Although there has been shown only one temple and an eye glass frame, it is to be understood that the two temples are identical, in order to provide accurate alignment for either or both temples as may be necessary or desirable.

From the foregoing it will now be seen that there is herein provided an improved adjustment means for eye glasses which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. In combination with an eye glass temple having an elongated recess with an open side along the under surface thereof, an elongated supporting member pivoted at one end in said recess, set screw means fixed to said temple and bearing against said supporting member at the end opposite said pivoted end, said supporting member being movable about said pivot when said set screw is disengaged to vary the effective width of the temple to align opposite temples of an eye glass to compensate for a difference in the relative position of the ears on the head of an individual.

2. The structure of claim 1 wherein said elongated recess is provided with an upwardly extending slot at one end thereof and said supporting member is provided with an offset extension extending into said slot serving as a guide for the pivotal movement of said supporting member.

3. The structure of claim 2 wherein a threaded bushing is positioned on the side wall of the temple adjacent said slot, and said set screw is extended through said bushing engaging said supporting member to hold the same in a selected position of adjustment.

References Cited in the file of this patent

UNITED STATES PATENTS

| | | |
|---|---|---|
| 1,699,083 | Stevens et al. | Jan. 15, 1929 |
| 2,781,693 | Brumby | Feb. 19, 1957 |

FOREIGN PATENTS

| | | |
|---|---|---|
| 61,536 | Germany | Mar. 26, 1892 |